United States Patent [19]

Tschanz

[11] 4,370,820
[45] Feb. 1, 1982

[54] SELECTIVELY INTERCONNECTABLE INFORMATION CARD HOLDER ARRANGEMENT

[76] Inventor: Pierre Y. Tschanz, Neuwis 25, 8700 Küsnacht, Switzerland

[21] Appl. No.: 122,043

[22] Filed: Feb. 19, 1980

Related U.S. Application Data

[63] Continuation-in-part of Ser. No. 934,490, Aug. 17, 1978, abandoned.

[30] Foreign Application Priority Data

Aug. 18, 1977 [CH] Switzerland ............. 10153/77

[51] Int. Cl.³ ................................. B42F 17/00
[52] U.S. Cl. ...................... 40/388; 40/159; 150/39
[58] Field of Search ............ 40/124.2, 159, 16 R, 40/405, 388, 537; 150/39

[56] References Cited

U.S. PATENT DOCUMENTS

| | | | |
|---|---|---|---|
| 2,431,472 | 11/1947 | Fistell | 150/39 |
| 3,556,188 | 1/1971 | Thomas | 150/39 |
| 3,565,148 | 2/1971 | Miller | 150/39 |
| 3,999,317 | 12/1976 | Owens | 150/39 |

*Primary Examiner*—Gene Mancene
*Assistant Examiner*—Wenceslao J. Contreras
*Attorney, Agent, or Firm*—Frishauf, Holtz, Goodman & Woodward

[57] ABSTRACT

A plurality of information carrier holders, each having flat, transparent pockets, are connected together selectively along mutually perpendicular axes so that they can be longitudinally connected or stacked into a predetermined pattern to display in correct positional relationship information carriers, e.g. elongated cards held in the pockets. Connecting means which may be the information carriers themselves between individual pocket-containing elements permit them to be replaced or added. In another embodiment the connection means is by interlocking ribs of adjacent elements.

8 Claims, 7 Drawing Figures

SELECTIVELY INTERCONNECTABLE INFORMATION CARD HOLDER ARRANGEMENT

This application is a continuation-in-part of my U.S. Ser. No. 934,490, filed Aug. 17, 1978, abandoned.

The invention relates to an arrangement for selectively systematically locating information carriers, such as file cards, which carry information forming elements of an orderly pattern, or a thought, or organization diagram.

BACKGROUND AND PRIOR ART

Ordered thought and organization diagrams can be graphically represented by a system of boxes interconnected by lines, as is conventionally used for representing a genealogical table, a network plan, or a flow chart. The individual boxes contain in shortened or abbreviated form characterising details of features, conditions and the like which are specific to the individual elements of the diagram. However, these known representations in one plane have the disadvantage that in the case of complicated or greatly branched diagrams, the representation requires a correspondingly large surface area and sufficient space cannot be provided in the boxes to present adequate information. Such known representations in one plane often require several square meters of paper surface, so that they have to be subdivided into smaller unit areas and can only be brought into a suitable size for filing or transportation by folding. Moreover, these representations may not easily be amended or modified, e.g. by the subsequent addition of new boxes in any place of a representation, because such change would require a corresponding change of the arrangement of other boxes in the representation.

THE INVENTION

It is the object of the present invention to provide a device and arrangement which eliminates these disadvantages and consequently permits an arrangement of the above-indicated type of a great number of blocks, boxes or information carriers, such as cards, which can be provided with comprehensive information, while at the same time allowing to insert new boxes and withdraw existing ones without interfering with the remainder of the representation.

Briefly, the information items, in box, or block layout, conventionally drawn on a sheet or paper is placed on cards. Each information carrier, briefly, a card, consists of a rectangular card-like or surface element of, for example, about 5×15 cm. or, e.g. a 3×5 inch file card. Instead of locating of these information carriers or cards, by spreading them in one plane, like a conventional planar representation, each card is connected to at least one other, either in the same plane or in two superimposed planes. For this purpose, as further described hereinafter, connecting holder elements are provided—either for these information carriers themselves or in the form of separate card carriers with connecting elements—for their detachable connection to one another in a direction along their longer edge and located in the plane of the information carrier, as well as in a direction at right angle thereto, i.e., along the shorter edge. The connections along the longer edge align the cards in one plane; the connections along the shorter edge superimpose the information carriers and permit flipping upwardly; the upper information carrier can be pivoted the same way as the pages of a book.

As a result of such an arrangement, it is possible to arrange flat surface information carriers or cards by connecting them in a way representative of the logical order of a network plan. The cards carrying information corresponding to two alternative sub-concepts stemming from a common concept in the network plan are superimposed and connected to each other along their shorter edge, typically the left edge, in the direction of a fold axis, to permit flipping the upper information carrier like a page of a book. The information carrier corresponding to the common concept from which the two alternative sub-concepts stem, is connected to the lower of the two superimposed cards above-mentioned, along its upper longer edge, i.e., at right angle to the fold axis. Thus, boxes arranged in the same horizontal line of an alternative in a network plan are represented by superimposed information carriers, whereas cards of a subalternative continue each alternative in the same alignment.

Figure 1:
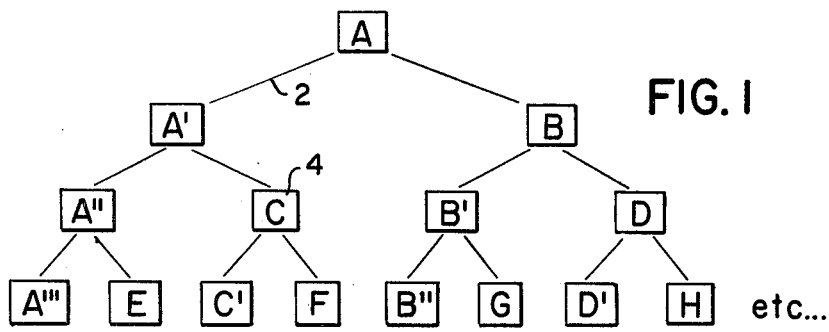
FIG. 1 is a diagram of a network plan representation in accordance with a conventional prior art layout, in connection with which the present invention will be described.

The diagram of FIG. 1 serves as example for the clear representation of a thought sequence, for example for determining the legal consequences of given facts. By means of this representation of a diagram which has been once worked out, a considerable saving of intellectual activity is possible, because it is possible to avoid a constant repetition of the thought sequence for dealing with new cases or for taking up old cases again. It can therefore also be a system for arranging solution possibilities independently of given facts, or can be the representation of logic interconnections. Although in the represented diagram each element A, A', B, A", C, etc. is only continued as two alternatives, it is obvious that there can be various numbers of alternatives with a correspondingly different network of lines 2 and boxes 4.

The device according to the present invention permits the arrangement and connection to one another of numerous card-like information carriers 6, 7 (FIG. 2, 3), while respecting the order of the diagram of FIG. 1. The information carriers corresponding to blocks A, B, D, H of the diagram are arranged in the direction of three dimensional Cartesian coordinate axes. One axis, in the example the "y" axis, is directed parallel to the narrower-sided edge of the rectangular information carriers corresponding to boxes A, B, D, H in the represented example. Information carriers representing information boxes A, B, D, H are connected together at the respective lower and upper wider-sided edge by holders, so that they will be staggered in the direction of the "y" axis. Thus, some information carriers, e.g. those representing boxes A, B, D and H are interconnected in the direction of the "x" axis. Other information carriers, e.g., those representing blocks or boxes A', B' and D', (FIG. 1) are interconnected at right angle to this axis, i.e., along their shorter edge, i.e., the "y" axis, lying on top of the information carrier or card to which they are connected (e.g. B, D, H).

Figure 5:
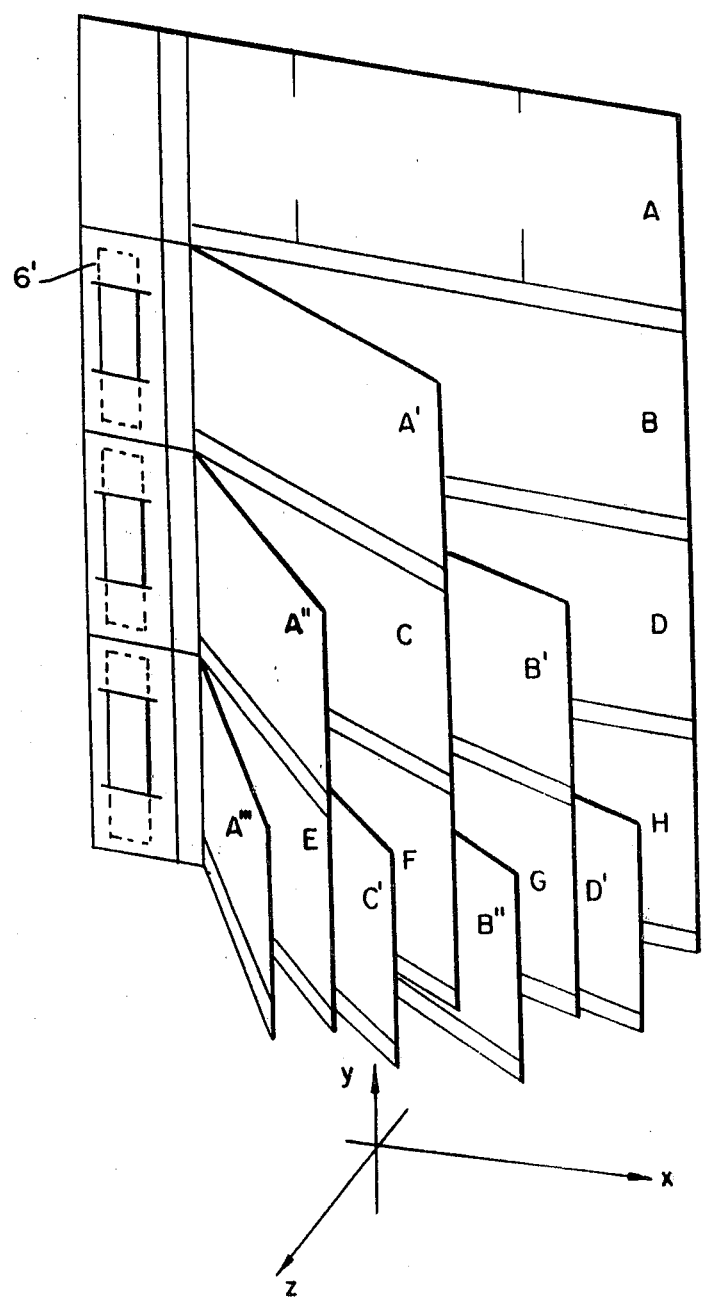
FIG. 5 is a highly schematic perspective view of the device of the invention according to the preferred embodiment described in FIG. 2, and shown standing like an open book.

The connection between two information carriers, 6, 7 (FIGS. 2, 3) will be described in greater detail herinafter. The connection is severable or detachable so that at a desired subsequent time further subalternatives can be inserted at any point in the diagram without it being necessary to modify the overall diagram and without disturbing the arrangement of the already existing alternatives and subalternatives. On detaching an information carrier, e.g., the one representing box B of the diagram, from the information carrier representing box A, all the information carriers connected, directly or through others, to the detached information carrier B follow this carrier. In this example, see FIG. 5, therefore, the result of detaching of the information carrier B from the information carrier A is that the information carrier A will be separated from the remainder of the diagram due to the connections of D to B at the "x" axis, of B to A' at the "y" axis, etc. Detaching carrier D from B—see FIG. 5—also removes carriers D', H and the superposed carriers B', "B", G, while leaving the branch below A' intact.

The overall size of the device in the direction of the holder "y" or flip axis corresponds to the narrow-side length of the cards 6, 7 multiplied by the number of cards that axis, i.e. representing the horizontal lines of the diagram (FIG. 1) plus connecting space, while the size in a direction of the "x" axis corresponds to the length of a card 6, 7. The thickness of the device in the direction at right angle to the plane of the cards is determined by the number of alternatives arranged in each horizontal line of the diagram multiplied by the thickness of one card carrier, or pocket and card thereon, with connecting means.

Figure 2:
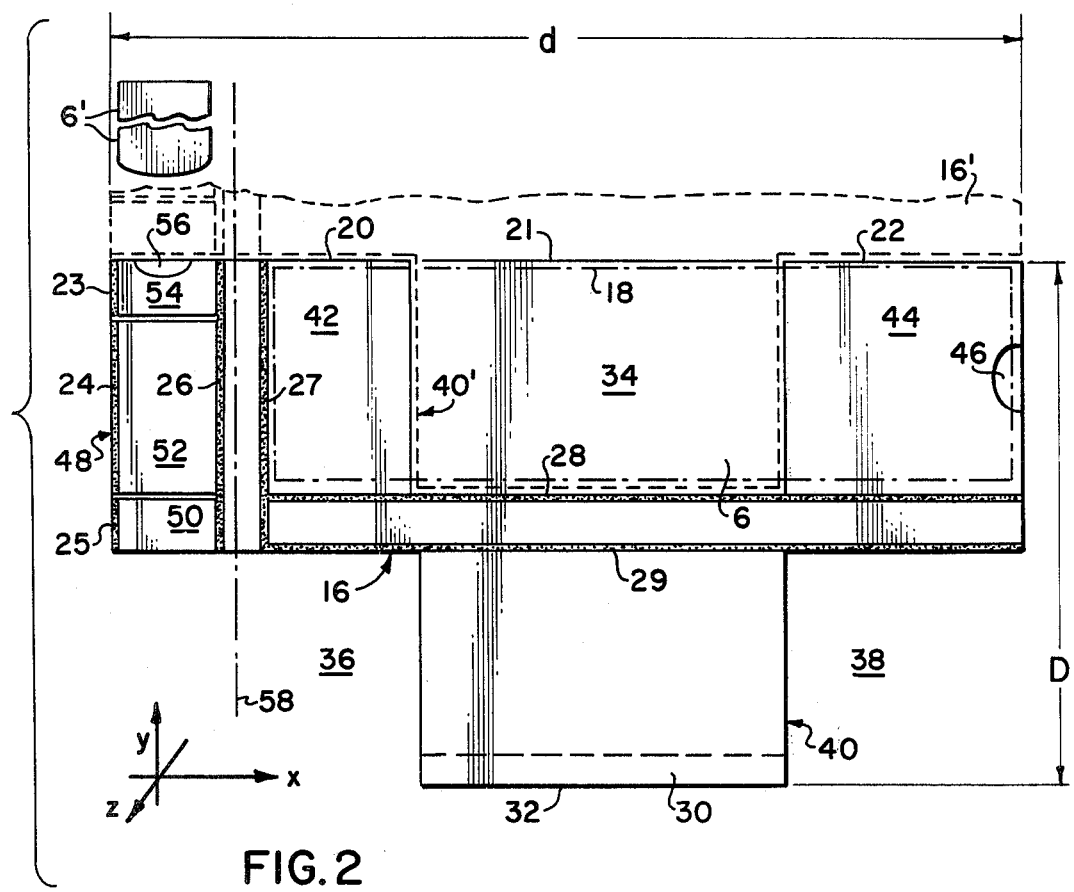
FIG. 2 is a holder partially schematic plan view of a device composed of a standard pocket-like connecting element with a card-like information carrier inserted in accordance with a preferred embodiment of the present invention.
Figure 2A:
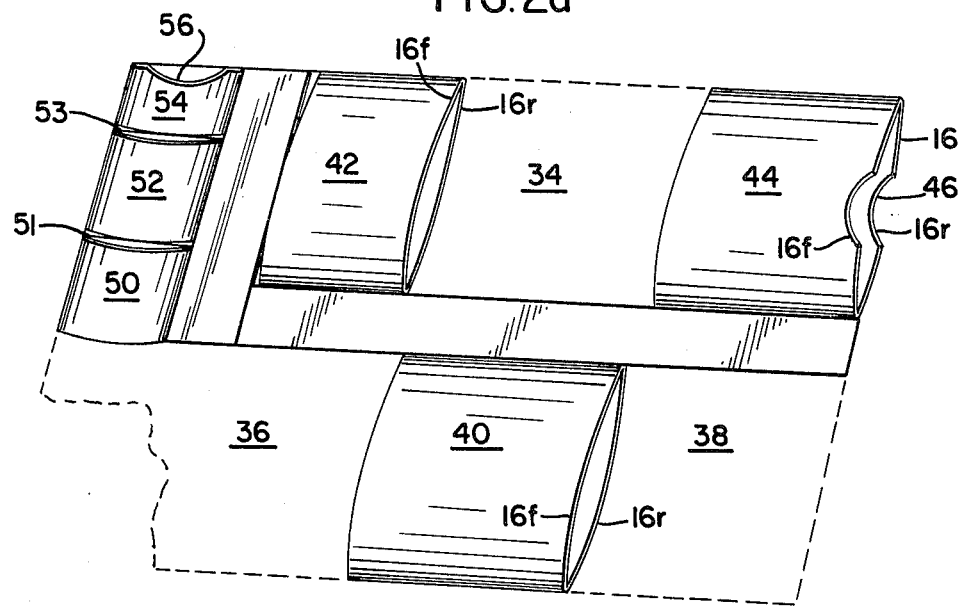
FIG. 2a is a perspective view of a single holder device without the card-like information carrier inserted within.
Figure 2B:
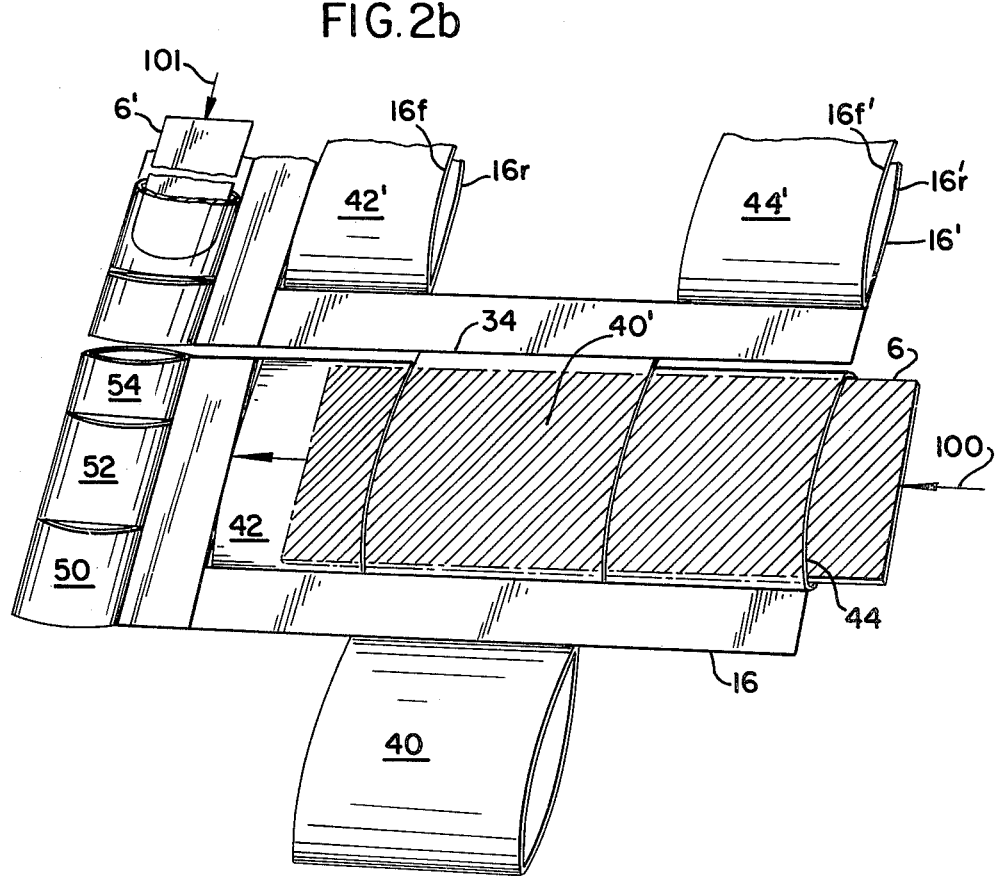
FIG. 2b is a perspective view of two holder devices connected together by an information carrier card partly inserted therein and carrying information illustrated as hatching.

FIG. 2 shows in the form of solid lines a connecting holder element in form of a pocket-like card carrier 16 for a card-like information carrier 6 of about 5×15 cm size, the outline of which is shown by the chain-dotted lines 18. The connecting holder element 16 is formed by a transparent plastic foil slightly longer than twice or more times the dimension D and of width d folded along edges 20, 21, 22 so that it has a front and rear wall 16*f* and 16*r* (FIG. 2*a*) which are welded together along the seam lines 23 to 29. In the bottom marginal region 30, the front foil wall is folded over the edge 32 of the rear foil wall and is fastened thereto, e.g. by an adhesive, or the edge 32 is welded closed. A central cut-out 34 and two lateral cut-outs 36, 38, are then removed, to obtain the configuration of the connecting element 16 as best seen in FIGS. 2 and 2*a*. The pocket-like portion 40 located between cut-outs 36, 38 is dimensioned in such a way that it can be placed in the outline of cut-out 34 of an adjacent connecting element, not shown, located below the element 16, in the same plane. A pocket-like portion 40' (FIG. 2*a*) of an adjacent connecting 16' located above, is shown in broken lines in FIG 2 fitted into the cut-out 34. The interfitting relationship is best seen in FIG. 2*b*. Since each carrier has pocket-like portions 42, 44 remaining on both sides of cut-out 34, a card 6 can be inserted in the direction of arrow 100 (FIG. 2*a*) through these three horizontally series-aligned pocket-like portions, i.e. pocket 44 of carrier 16 pocket, 40'of an adjacent carrier 16' and pocket 42 of carrier 16, so that a connection is obtained along the "x" axis between two adjacent, interfitted, connecting elements 16, 16', pocket staggering elements 16, 16' along the "y" axis. A thumb opening 46 is provided laterally on the pocket-like portion 44 to facilitate the removal of card 6. Card 6 is written on to carry information, e.g. corresponding to box B. FIG. 2*b* also shows the pocket-like portions 42', 44' of the carrier 16', left empty, for ease of visualization, as well as front and rear walls 16'*f* and 16'*r* of carrier 16'.

In the same fashion, a card, which may also carry information is used for connecting along the "y" axis two superimposed pocket-like connecting card holder elements to allow folding about line 58. The region between seams 23, 24, 25 and 26 is divided into three pocket-like portions 50, 52, 54 separated by transverse cuts 51, 53. The pockets 50, 52, 54 are aligned along the narrow-side edge 48 of connecting card holder element 16. A narrow, preferably pointed flexible, elongated strip element, e.g. a card, 6' e.g. of 1.5×6 cm is inserted vertically, see arrow 101, FIG. 2*b* with respect to carrier 6', i.e., in a direction parallel to the "y" axis. Seams 26, 27 form a living hinge. A thumb opening 56 is provided in the pocket-like portion 54 to facilitate removal of the strip element 6'. On making a connection of a card holder 16' with another holder to be superimposed thereover, the vertical strip element 6' is snaked through the top outer pocket-like portion 54 of one holder 16', then through the inner pocket-like portion 52 of a second, superimposed, holder—the outer portions 50, 54 of the second being left empty—laying above the first element, and then through the remaining portion 50 of the lower holder. The outer portions 50, 54 of the superimposed holders are available for connection with yet additional such connecting card holder elements thereabove superimposed.

Figure 3:
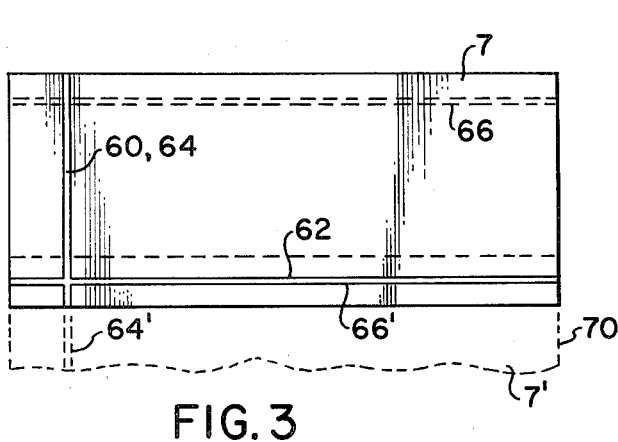
FIG. 3 is a schematic plan view of a device in accordance with another suitable embodiment of the present invention where the connecting means are located on the front and back sides of the information carrier itself.
Figure 4:
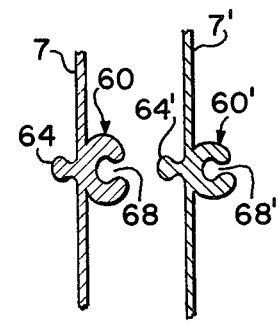
FIG. 4 is an enlarged cross-sectional view of the connecting means used in the device or FIG. 3.

FIG. 3 shows a rectangular information carrier and holder combination made from a plastic foil, which can either be directly labeled or can serve as a receiving surface for an adhesive label. For connection to the adjacent carrier element 7' in the manner indicated hereinbefore, i.e. in juxtaposed horizontal axial direction or in superimposed manner at right angles to the horizontal axis, beads or ribs 60, 62 are provided projecting on the front side of information carrier 7, and ribs 64, 66 on the back side of the same information carrier. A groove 68 (FIG. 4) is provided in rib or bead 60 at the front of the surface element, which is dimensioned in such a way that it can receive in interlocked manner the rib 64', located on the back of a superimposed carrier. A similar arrangement is used for ribs 62, 66. The connection is similar to a snap-in connection. FIG. 3 indicates by broken lines 70 an information carrier 7' connected with information carrier 7 on the "x" axis and staggered in the direction of the "y" axis. Marginal areas of the two information carriers overlap and the ribs 66', 62 provided in the marginal areas are interlockingly engaged. Thus, also information carrier 7 according to the embodiment of FIG. 3 can be detachably interconnected both in adjacent manner at the "x" axis and in superimposed manner at the "z" axis. In the latter case, ribs 60 of carrier 7 and 64' of a superimposed carrier are interlockingly engaged (not represented in FIG. 3).

It is apparent that individual information carriers in the described arrangement can also be interconnected by means of differently constructed connecting elements, such as e.g. strip-like burr connections, clips engaging in perforations, adhesive strips, adhesive surfaces, and the like.

I claim:

1. A device for the detachable arrangement of information carriers (6) whose information is an element of an ordered thought, or organization diagram in an order of alternatives and subalternatives, wherein each information carrier (6) comprises an essentially rectangular card-like element,
and comprising
a double-wall (16f, 16r) connecting card-holder element (16) having
two lateral pocket-like portions (42, 44),
a central cut-out or opening (34) located between the lateral pocket-like portions, the dimension or the two lateral portions and the central cut-out together matching approximately the shape and size of the essentially rectangular card-like information carrier (6),
a central pocket-like portion (40) of approximately the same size as the central opening or cut-out (34) and projecting in alignment with the central opening, to permit fitting a pocket-like portion (40') of a further similar, adjacently located connecting card holder element positioned in the plane of the said connecting card holder element (16) into the central opening (34) thereof and permit insertion of the card-like information carrier element (6) through the lateral pocket-like portions (42, 44) of said connecting card holder element and the central pocket-like projecting portion (40') of the further adjacently located connected card holder element;
said information carrier element (6) simultaneously providing the information carried thereon as well as forming the connection between two adjacent connecting card holder elements located in the same plane;
and wherein the connecting card holder element further comprises three side pocket portions (50, 52, 54) located in alignment along the narrow side of the connecting card holder element,
and an elongated flexible strip 6' insertable simutaneously through the two outer side pocket-like portions (54, 50) of said connecting card holder element and through the inner pocket-like portion (54, 50) of an additional, similar superimposed connecting card holder element
said elongated strip (6') thus producing a connection between two superimposed connecting card holder elements.

2. Arrangement to display information comprising a plurality of card holder connecting elements (16) according to claim 1
wherein some of the connecting card holder elements are connected in said plane of the said connecting element (16) by the card-like information carrier element (6) being passed through the lateral pocket-like portions (42, 44) of said element (16) and the central pocket-like projecting portion (40') of the further adjacently located element (16') and at least one additional connecting card holder element is connected to one of said connecting card holder elements in said plane by being superimposed in a plane parallel to said one plane,
the flexible strip (6') being passed, in undulating manner, through two pockets at the extremes of a lower one of the connecting elements and the central pocket of the next adjacent superimposed connecting element for connecting said superimposed, stacked elements together in said superimposed, stacked planes;
and a further card-like information carrier element (6) located in the lateral pocket like portions (42, 44) spanning the central cut-out, or opening (34) within said additional connecting card-holder element, to provide for information display positioned in three dimensions.

3. Device according to claim 1 or 2 wherein the connecting card holder element includes pivot means to enable pivoting of the pocket-like portions about a common axis located in the plane thereof.

4. Device according to claim 1 or 2, including seams delimiting at least some of the pocket-like portions (42, 44, 50, 52, 54), the seams inter-connecting the two wall portions of the connecting card holder element.

5. Device according to claim 1 or 2 wherein the connecting card holder element comprises a transparent foil.

6. A device for the detachable arrangement of information carriers (6) whose information is an element of an ordered thought, or organization diagram in an order of alternatives and subalternatives,
wherein each information carrier (6) comprises an essentially rectangular card-like element,
and comprising an essentially rectangular sheet-like support (7) having two opposite narrow edges and two opposite long edges positioned at right angles to said narrow edges;
and projection-and-recessed connecting means having a projecting portion and a recessed portion located
(a) along one of the narrow edges of the sheet-like support, said portions being located facing respectively opposite surfaces of the sheet-like support and
(b) along two long edges of said support, the projecting portion extending on the front surface of one of the long edges of the support and the recessed portion extending on the back surface of the other long edge of the support.

7. A device according to claim 6 wherein the projection and recess means comprises a bead having a projecting rib (64) forming said projecting portion, and a groove (68) on the other side of the bead and facing the other side of the support and forming said recessed portion.

8. A device according to claim 6 or 7 wherein the sheet-like support comprises a plastic foil capable of being directly labeled and carrying said information, or receiving a label carrying said information.

* * * * *